United States Patent
Jeong et al.

(10) Patent No.: US 9,048,737 B2
(45) Date of Patent: Jun. 2, 2015

(54) SWITCHING-MODE POWER SUPPLY (SMPS) HAVING OVERVOLTAGE CUTOFF FUNCTION, AND METHOD OF CUTTING OFF OVERVOLTAGE AND IMAGE FORMING APPARATUS USING THE SMPS

(75) Inventors: An-sik Jeong, Hwaseong-si (KR); Yong-geun Kim, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 147 days.

(21) Appl. No.: 13/617,980

(22) Filed: Sep. 14, 2012

(65) Prior Publication Data
US 2013/0129367 A1 May 23, 2013

(30) Foreign Application Priority Data
Nov. 21, 2011 (KR) .................. 10-2011-0121730

(51) Int. Cl.
*G03G 15/00* (2006.01)
*H02M 3/335* (2006.01)

(52) U.S. Cl.
CPC ............ *H02M 3/33507* (2013.01); *G03G 15/80* (2013.01)

(58) Field of Classification Search
CPC .......................... H02M 3/33507; G03G 15/80
USPC ......... 363/21.01, 56.01; 361/91.6; 399/37, 88
See application file for complete search history.

(56) References Cited

U.S. PATENT DOCUMENTS

2009/0174978 A1* 7/2009 Nakamura ..................... 361/90
2009/0213629 A1* 8/2009 Liu et al. ......................... 363/89

FOREIGN PATENT DOCUMENTS

| JP | 2002-051453 | 2/2002 |
| JP | 2004-229414 | 8/2004 |
| KR | 1019990015134 | 3/1999 |

* cited by examiner

*Primary Examiner* — David Gray
*Assistant Examiner* — Sevan A Aydin
(74) *Attorney, Agent, or Firm* — Staas & Halsey LLP

(57) ABSTRACT

A switching-mode power supply (SMPS) for an image forming apparatus which may prevent an overvoltage supplied to the SMPS, and damage to circuits in the SMPS in the image forming apparatus. The SMPS includes a rectifying circuit to rectify an alternating-current (AC) voltage input from an external power supply source into a direct-current (DC) voltage, a transformer to transform the rectified DC voltage input to a primary coil and output the transformed DC voltage to a secondary coil, a main switch that is connected to the primary coil and switches an output of the transformer, a first overvoltage detecting unit to determine whether the rectified DC voltage is an overvoltage by comparing the rectified DC voltage with a first reference voltage, and a switching control unit to control a switching operation of the main switch based on a result of the determination.

9 Claims, 10 Drawing Sheets

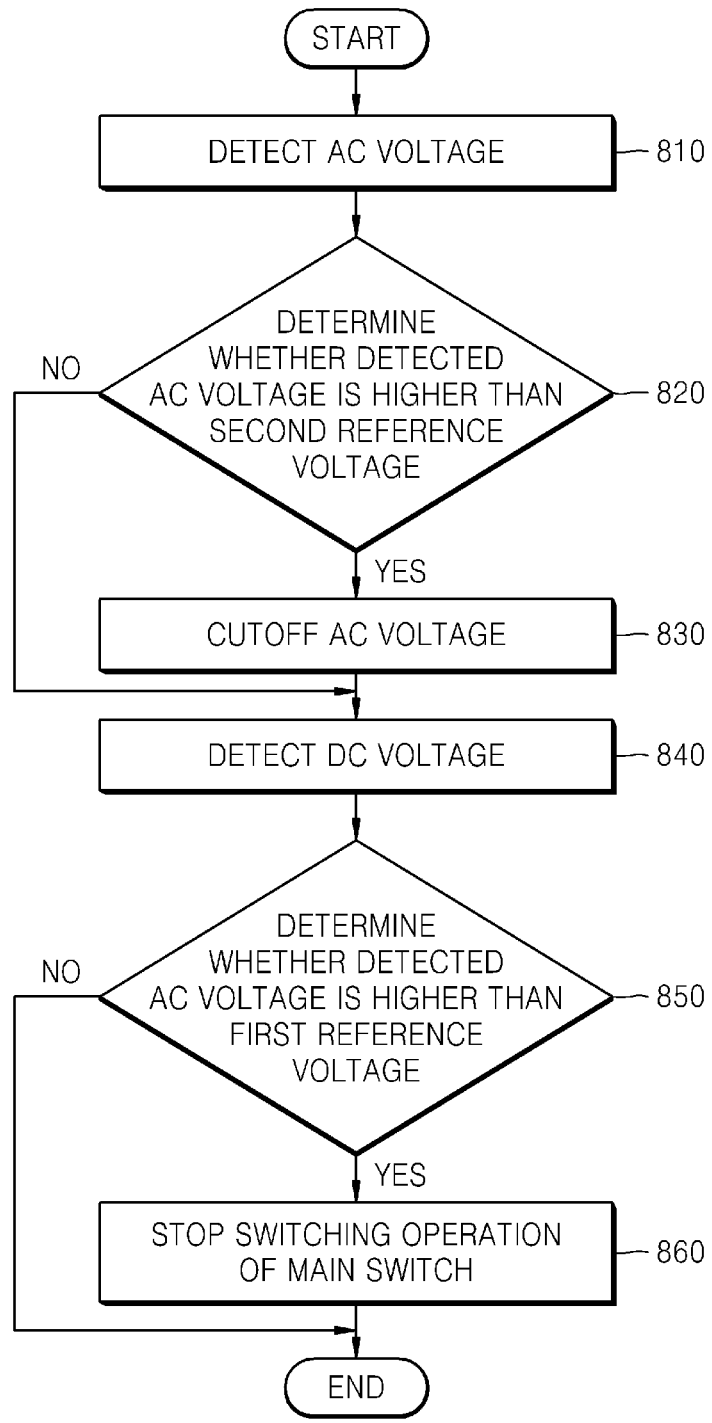

SWITCHING-MODE POWER SUPPLY (SMPS) HAVING OVERVOLTAGE CUTOFF FUNCTION, AND METHOD OF CUTTING OFF OVERVOLTAGE AND IMAGE FORMING APPARATUS USING THE SMPS

CROSS-REFERENCE TO RELATED APPLICATIONS

This application claims the benefit of Korean Patent Application No. 10-2011-0121730, filed on Nov. 21, 2011, in the Korean Intellectual Property Office, the disclosure of which is incorporated herein in its entirety by reference.

BACKGROUND

1. Field

The present general inventive concept relates to a switching-mode power supply (SMPS) having an overvoltage cutoff function, and a method of cutting off an overvoltage and an image forming apparatus using the SMPS, and more particularly, to an SMPS for an image forming apparatus which may minimize and/or prevent an overvoltage and damage to the circuits in the SMPS and the image forming apparatus when a voltage higher than a rated voltage of the SMPS is supplied to the SMPS. The present general inventive concept also relates to a method of cutting off an overvoltage and an image forming apparatus and/or electronic device including the SMPS.

2. Description of the Related Art

A switching-mode power supply (SMPS) refers to a device that transforms an alternating-current (AC) voltage supplied from an external power supply source by using a transformer and outputs a direct-current (DC) voltage appropriate for an electronic product. An SMPS is more efficient, more durable, smaller, and lighter than a linear power supply.

Since an image forming apparatus, such as a printer or a copier, requires a power supply having a simple structure, a small size, and a stable power supply function, an SMPS is often used.

While South Korea uses an AC voltage of 220 V at 60 Hz as a standard voltage, other countries use various standard voltages according to their actual conditions. Although some countries use voltages of 100 V, 127 V, and 140 V, many countries use a voltage of 110 V or 220 V. In South Korea, an AC voltage of 220 V at 60 Hz is supplied to each household, and thus, most electronic products, such as an image forming apparatus, are only for 220 V or for both 110 V and 220 V.

An image forming apparatus receives an AC voltage from the outside and transforms the AC voltage into a DC voltage to be used therein. Such transformation occurs in an SMPS. Since parts in an SMPS vary according to an AC voltage input from the outside, if the AC voltage applied from the outside is higher than a rated voltage of the SMPS, the parts in the SMPS may be damaged, thereby leading to product liability (PL).

When an overvoltage is applied to an SMPS, a fuse of an AC power input terminal has blown by using a low-voltage varistor in order to avoid PL.

SUMMARY

The present general inventive concept provides a switching-mode power supply (SMPS) having an overvoltage cutoff function, a method of cutting off an overvoltage, and an image forming apparatus using the SMPS. Technical problems to be solved by embodiments of the present general inventive concept are not limited to those described above, and other technical problems may be solved by from the following embodiments.

Additional features and utilities of the present general inventive concept will be set forth in part in the description which follows and, in part, will be obvious from the description, or may be learned by practice of the general inventive concept.

In exemplary embodiments of the present general inventive concept, an SMPS is provided for an image forming apparatus, the SMPS including a rectifying circuit unit to rectify an alternating-current (AC) voltage input from an external power supply source into a direct-current (DC) voltage, a transformer to transform the rectified DC voltage input to a primary coil and outputs the transformed DC voltage to a secondary coil, a main switch that is connected to the primary coil to switch an output of the transformer, a first overvoltage detecting unit to determine whether the rectified DC voltage is an overvoltage by comparing the rectified DC voltage with a first reference voltage, and a switching control unit to control a switching operation of the main switch based on a result of the determination.

The switching control unit may stop the switching operation when it is determined that the rectified DC voltage is an overvoltage.

The switching control unit may be a pulse width modulation (PMW) integrated circuit (IC) and may stop the switching operation when a signal indicating an overvoltage is input to a predetermined Pin of the PWM IC form the first overvoltage detecting unit.

The first overvoltage detecting unit may include a power detecting unit to detect the rectified DC voltage, and a first overvoltage determining unit to determine whether the detected DC voltage is an overvoltage by comparing the detected DC voltage with the first reference voltage.

The first overvoltage determining unit may determine whether the detected DC voltage is an overvoltage by using a Zener diode that has the first reference voltage as a breakdown voltage.

The first overvoltage detecting unit may determine whether the rectified DC voltage is an overvoltage by determining whether the rectified DC voltage is higher than the first reference voltage that corresponds to a maximum allowance of a rated voltage of the SMPS.

A second overvoltage detecting unit may transform the input AC voltage and determine whether the transformed AC voltage is an overvoltage by comparing the transformed AC voltage with a second reference voltage, and a cutoff unit that may cut off the input AC voltage input to the rectifying circuit based on a result of the determination of the second overvoltage detecting unit.

The second overvoltage detecting unit may include a potential transformer to transform the input AC voltage according to a predetermined turns ratio, a rectifier to rectify the transformed AC voltage into a DC voltage, and a second overvoltage determining unit to determine whether the DC voltage rectified by the rectifier is an overvoltage by comparing the rectified DC voltage with the second reference voltage.

The second overvoltage determining unit may determine whether the rectified DC voltage is an overvoltage by using a Zener diode that has the second reference voltage as a breakdown voltage.

The cutoff unit may cut off the input AC voltage input to the rectifying circuit unit by using any one of a relay, a photo triac, and a photocoupler.

Exemplary embodiments of the present general inventive concept, may also provide a method of cutting off an overvoltage performed by a switching-mode power supply (SMPS) for an image forming apparatus, the method including detecting a direct-current (DC) voltage obtained by rectifying an alternating-current (AC) voltage input from an external power supply source, determining whether the detected DC voltage is an overvoltage by comparing the detected DC voltage with a first reference voltage, and controlling a switching operation of a main switch that switches an output of a transformer to transform the rectified DC voltage, based on a result of the determination.

The controlling of the switching operation of the main switch may also include stopping the switching operation when it is determined that the detected DC voltage is an overvoltage.

The determination of whether the detected DC voltage is an overvoltage may also include determining whether the detected DC voltage is an overvoltage by determining whether the detected DC voltage is higher than the first reference voltage that corresponds to a maximum allowance of a rated voltage of the SMPS.

The method of cutting off an overvoltage performed by the SMPS for the image forming apparatus may further include transforming the input AC voltage and determining whether the transformed AC voltage is an overvoltage by comparing the transformed AC voltage with a second reference voltage, and cutting off the input AC voltage before the input AC voltage is rectified, based on a result of the determination.

The determination of whether the transformed AC voltage is an overvoltage by comparing the transformed AC voltage with the second reference voltage may include transforming the input AC voltage according to a predetermined turns ration by using a potential transformer, rectifying the transformed AC voltage into a DC voltage, and determining whether the rectified DC voltage is an overvoltage by comparing the rectified DC voltage with the second reference voltage.

Exemplary embodiments of the present general inventive concept may also provide an image forming apparatus including a switching-mode power supply (SMPS), wherein the SMPS includes a rectifying circuit unit to rectify an alternating-current (AC) voltage input from an external power supply source into a direct-current (DC) voltage, a transformer to transform the rectified DC voltage input to a primary coil and outputs the transformed DC voltage to a secondary coil, a main switch that is connected to the primary coil and switches an output of the transformer, a first overvoltage detecting unit to determine whether the rectified DC voltage is an overvoltage by comparing the rectified DC voltage with a first reference voltage, and a switching control unit to control a switching operation of the main switch based on a result of the determination.

The SMPS may also include a second overvoltage detecting unit to transform the input AC voltage and to determine whether the transformed AC voltage is an overvoltage by comparing the transformed AC voltage with a second reference voltage, and a cutoff unit to cut off the input AC voltage input to the rectifying circuit based on a result of the determination of the second overvoltage detecting unit.

Exemplary embodiments of the present general inventive concept may also provide a switching-mode power supply (SMPS) including a rectifying unit to rectify a voltage input from a supply source, a first overvoltage detecting unit to detect the voltage rectified by the rectifying unit and to determine if the voltage is within a predetermined voltage range allowed by the SMPS, and a switching control unit to stop a switching operation of a main switch that is connected to the switching control unit to prevent an output unit from outputting the voltage when the detected voltage is greater than the predetermined voltage range.

The switching control may control the switching operation of the main switch to prevent the output unit from generating an output voltage greater than the predetermined voltage range.

The first overvoltage detecting unit may include an overvoltage determining unit to allow the first overvoltage detecting unit to determine if the voltage input from the supply source is greater than the predetermined voltage range.

The first overvoltage detecting unit may include a Zener diode to allow the first overvoltage detecting unit to determine if the voltage input form the supply source is greater than the predetermined voltage range.

The switching-mode power supply may also include a second overvoltage detecting unit to detect the voltage input from the supply source and to determine if the voltage is greater than the predetermined voltage range, and a cutoff unit to prevent the voltage input from the supply source from entering a filter unit when the voltage is greater than the predetermined voltage range.

The second overvoltage detecting unit may also include a Zener to allow the second overvoltage detecting unit to determine if the voltage input from the supply source is greater than the predetermined voltage range.

BRIEF DESCRIPTION OF THE DRAWINGS

The above and/or other features and utilities of the present general inventive concept will become more apparent by describing in detail exemplary embodiments thereof with reference to the attached drawings in which:

FIG. 8 is a flowchart illustrating a method of cutting off an overvoltage performed by the SMPS of FIG. 6, according to another embodiment of the present general inventive concept.

DETAILED DESCRIPTION OF THE PREFERRED EMBODIMENTS

Figure 1:
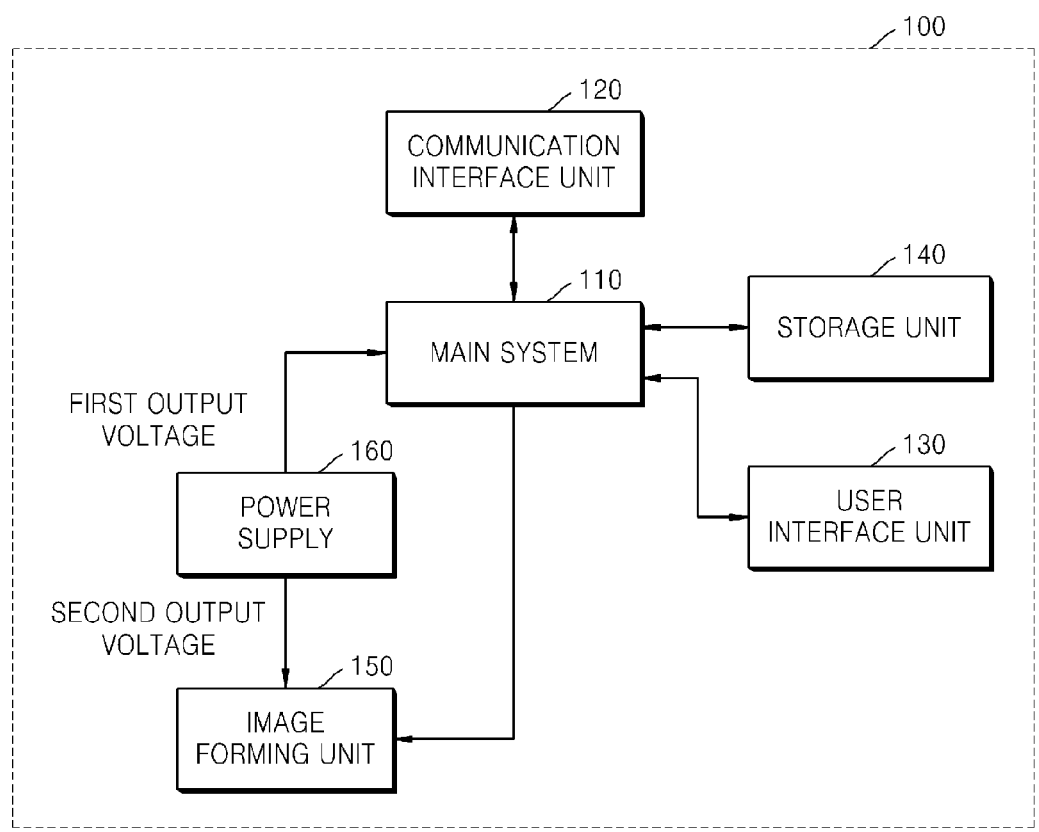
FIG. 1 is a block diagram illustrating an image forming apparatus including a switching-mode power supply (SMPS), according to an embodiment of the present general inventive concept.

The present general inventive concept will now be described more fully with reference to the accompanying drawings, in which exemplary embodiments of the present general inventive concept are illustrated. The present general inventive concept may, however, be embodied in many different forms and should not be construed as being limited to the embodiments set forth herein; rather these embodiments are provided so that this disclosure will be thorough and complete, and will fully convey the concept of the present general inventive concept to one of ordinary skill in the art. Numerous modifications and adaptations will be readily apparent to one of ordinary skill in this art from the detailed description and the embodiments without departing from the spirit and scope of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The embodiments relate to a switching-mode power supply (SMPS), and more particularly, to an SMPS for an image forming apparatus. Examples of a method of converting energy in circuits include a non-isolation method, such as a buck method, a boost method, or a buck-boost method, and an isolation method, such as a flyback method, a forward method, or a push-pull method. Although an SMPS using a flyback method is exemplarily explained, the present general inventive concept is not limited thereto. A detailed explanation of elements or features well known to one of ordinary skill in the art is not provided.

Figure 1A:
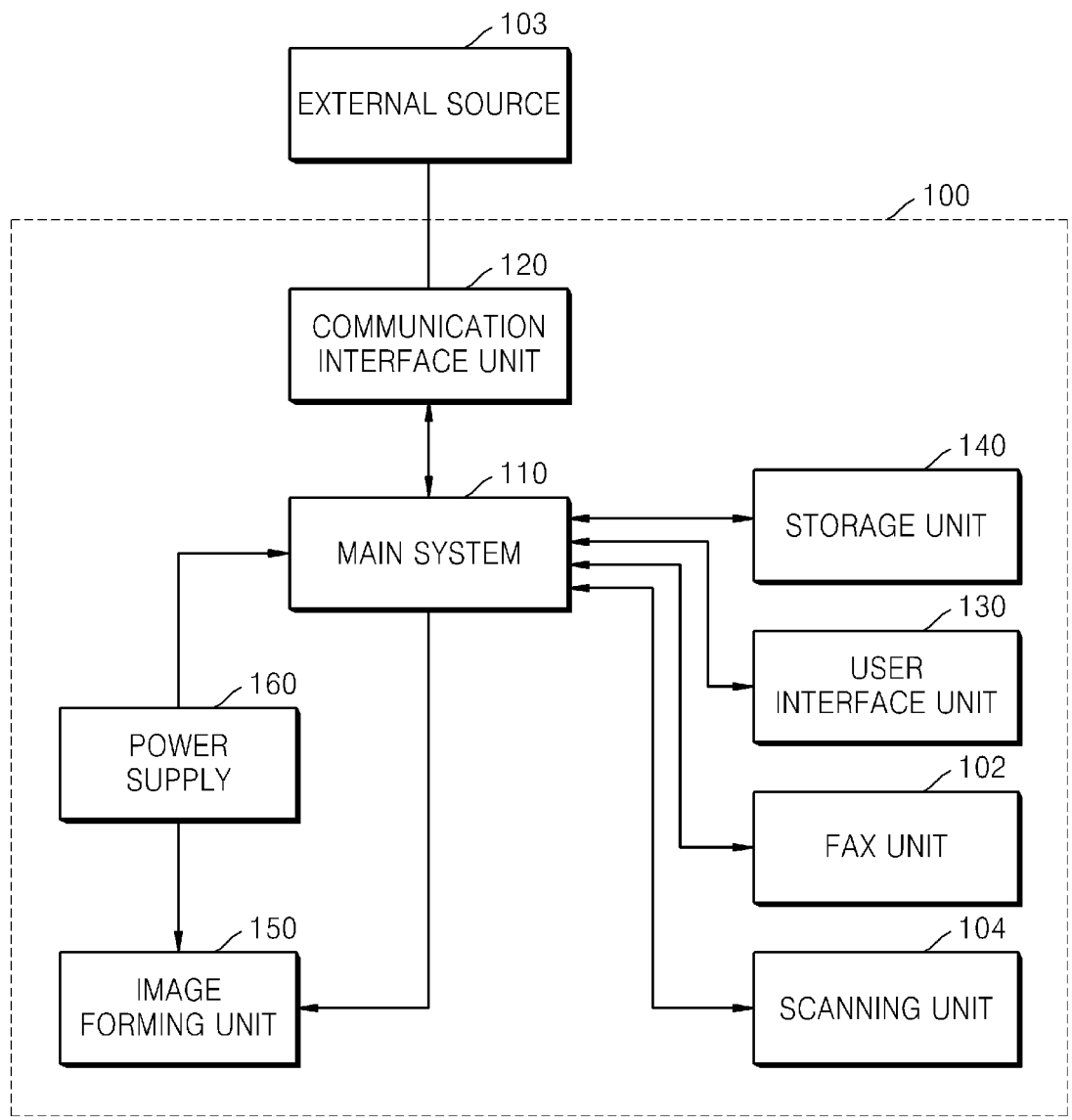
FIG. 1A is block diagram illustrating an image forming apparatus including a switching-mode power supply (SMPS) and a fax unit and/or a scanning unit, according to an embodiment of the present general inventive concept.

FIGS. 1-1A are block diagrams illustrating an image forming apparatus 100 including an SMPS, according to an embodiment of the present general inventive concept. Referring to FIG. 1, the image forming apparatus 100 includes a main system 110, a communication interface unit 120, a user interface unit 130, a storage unit 140, an image forming unit 150, and a power supply 160. In this case, the power supply 160 may be the SMPS. It would be understood by one of ordinary skill in the art that the image forming apparatus 100 may further include general-purpose elements other than the elements illustrated in FIGS. 1 and 1A.

For example, as illustrated in FIG. 1A, the image forming apparatus 100 may include a main system 110, a communication interface unit 120, a user interface unit 130, a storage unit 140, a power supply 160, a fax unit 102, or a scanning unit 104.

The fax unit 102 may generate fax data from at least one document received from an external source 103 (e.g. a laptop or desktop computer, mobile phone, etc.), and the generated fax data may be transmitted via the communication interface unit 120. The storage unit 140 can also include document data that can be converted by the fax unit 102 to fax data to be transmitted via the communication interface unit 120. The scanning unit 104 may be a scanner to scan at least one document inputted by the external source 103 to generate scan data to be stored in the storage unit 140, transmitted via the communication interface unit 120, or printed via the image forming unit 150 of the image forming apparatus 100.

Referring to FIGS. 1 and 1A, the main system 110 controls an overall function of the image forming apparatus 100. The main system 110 may include a controller to control an overall function of the image forming apparatus 100. The main system 110 may operate at a first output voltage output from the power supply 160. The first output voltage may be, but is not limited to, a direct-current (DC) voltage of 3.3 V or 5 V.

The communication interface unit 120 may include a modem to transmit or to receive a fax message, a network module to connect to a network, and a universal serial bus (USB) host module to form a channel through which data is exchanged with a removable storage medium, according to the function of the image forming apparatus 100. In this case, examples of an external device that is connectable to the image forming apparatus 100 via a wired or wireless network may include a facsimile machine, a computer system, a mobile terminal, a personal digital assistant (PDA), and a server.

The user interface unit 130 obtains an input signal from the external source 103. For example, the user interface unit 130 may include input/output devices such as a display panel, a mouse, a keyboard, a touch screen, a monitor, and a speaker provided on the image forming apparatus 100.

The storage unit 140 stores print data, scan data, and data generated when the image forming apparatus 100 operates.

The image forming unit 150 forms an image and prints print data on paper. The image forming unit 150 includes hardware units to perform electrifying, exposing, developing, transferring, and fixing operations, and software modules to drive the hardware units. The image forming unit 150 may operate at a second output voltage output from the power supply 160. The second output voltage may be, but is not limited to, a DC voltage of 12 V or 24 V.

Since the power supply 160 performs the same operation as that of an SMPS described below, a description made with reference to FIGS. 2 through 8 may apply to the power supply 160 of FIG. 1.

Figure 2:
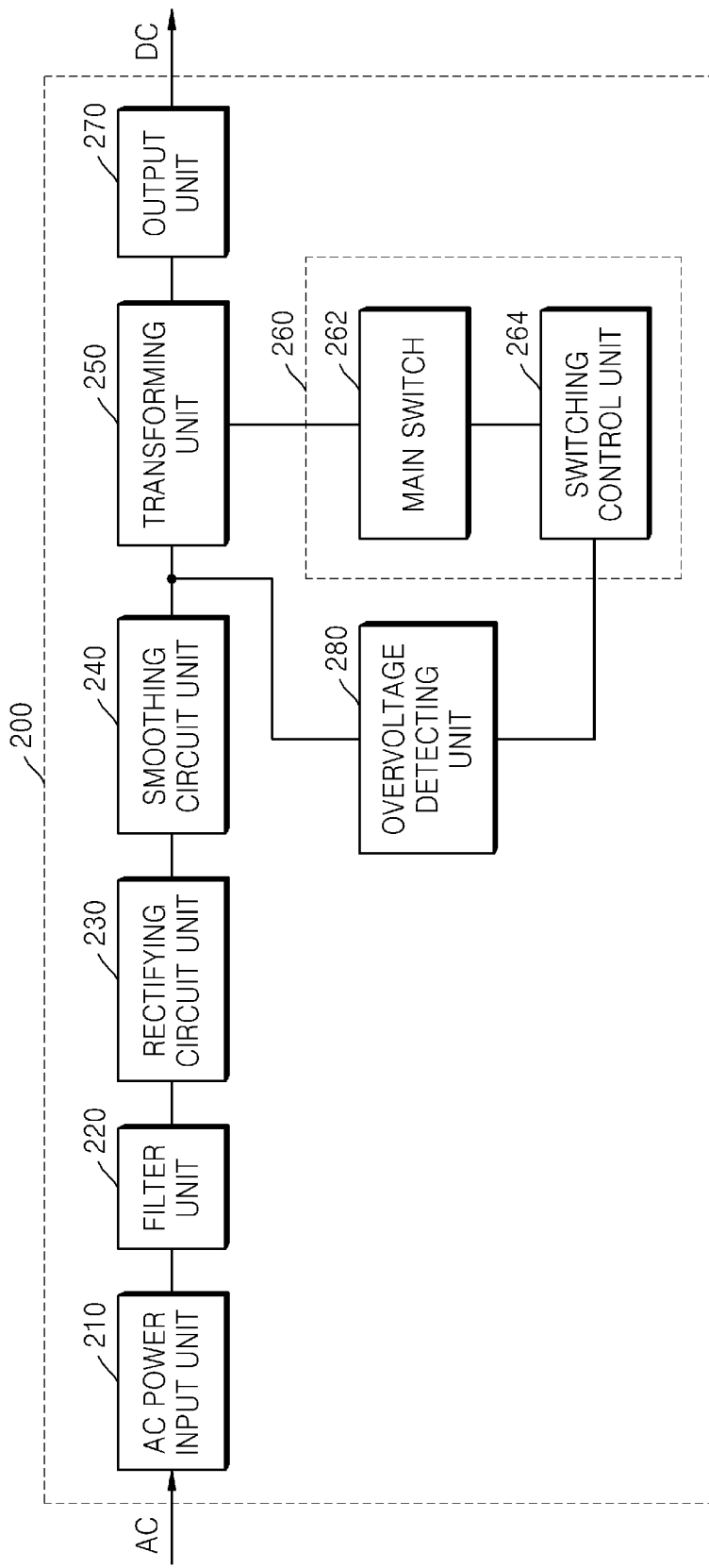
FIG. 2 is a block diagram illustrating an SMPS for an image forming apparatus having an overvoltage cutoff function, according to an embodiment of the present general inventive concept.

FIG. 2 is a block diagram illustrating an SMPS 200 for an image forming apparatus having an overvoltage cutoff function, according to an embodiment of the present general inventive concept. The SMPS 200 may be included in any of various image forming apparatuses, such as a printer, a copier, and a multifunction product. Referring to FIG. 2, the SMPS 200 includes an alternating-current (AC) power input unit 210, a filter unit 220, a rectifying circuit unit 230, a smoothing circuit unit 240, a transforming unit 250, a switching unit 260, an output unit 270, and an overvoltage detecting unit 280. The switching unit 260 may include a main switch 262 and a switching control unit 264. It would be understood by one of ordinary skill in the art that the SMPS 200 may further include elements other than the elements shown in FIG. 2.

Figure 2A:
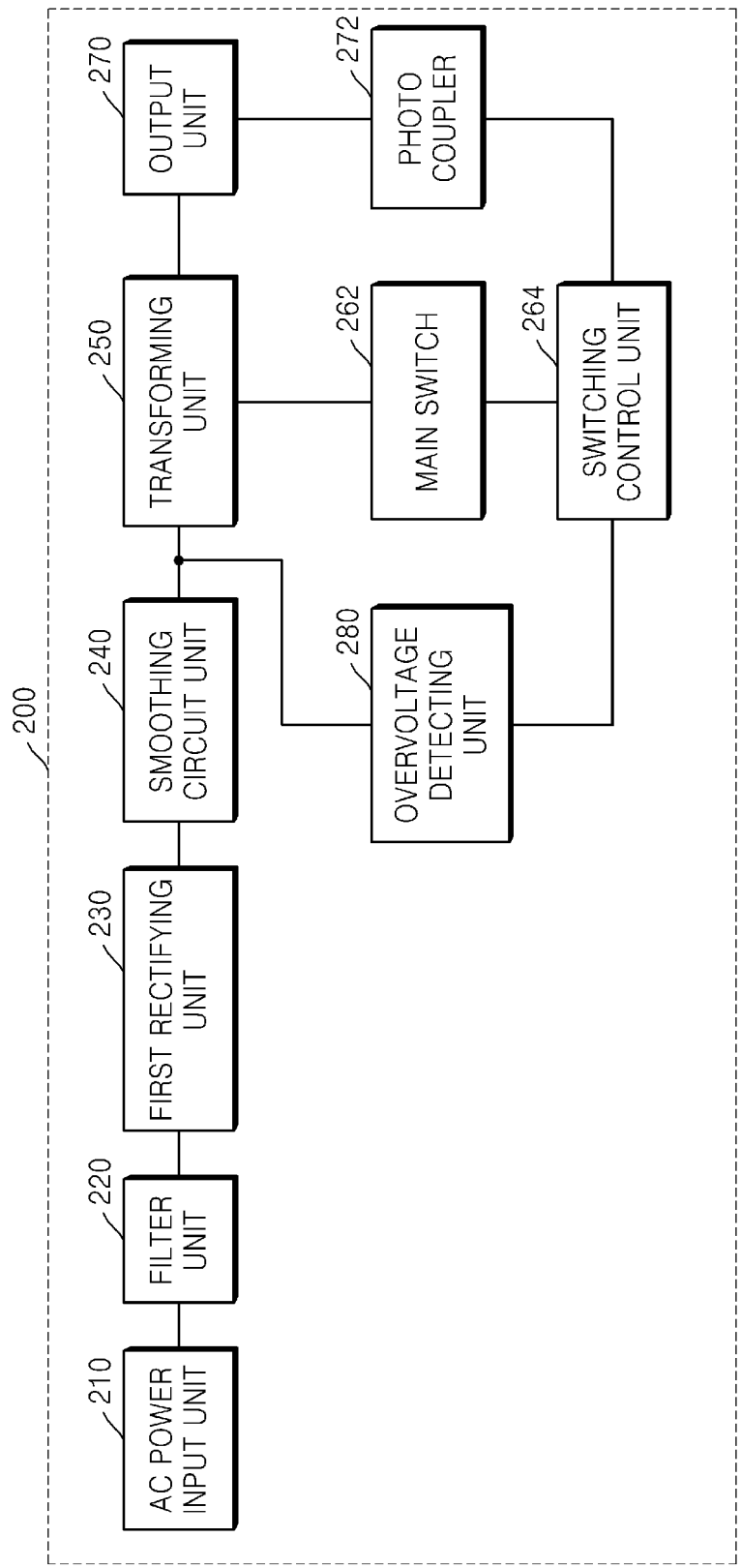
FIG. 2A is a block diagram illustrating an SMPS for an image forming apparatus having an overvoltage cutoff function, according to an embodiment of the present general inventive concept.

FIG. 2A is a block diagram illustrating an SMPS for an image forming apparatus having an overvoltage cutoff function as in FIG. 2. The SMPS 200 of FIG. 2A may include an alternating-current (AC) power input unit 210, a filter unit 220, a rectifying circuit unit 230, a smoothing circuit unit 240, a transforming unit 250, a switching unit 260, an output unit 270, an overvoltage detecting unit 280, a main switch 262, and a switching control unit 264 as in FIG. 2. The SMPS 200 of FIG. 2A may include a photocoupler 272 having a light-emitting diode to receive the output voltage of the output unit 270 and to emit light according to the output voltage. The photocoupler 272 may include a phototransistor to receive light emitted by the light-emitting diode and convert the light into electrical energy. The photocoupler 272 allows the switching control unit 264 to monitor an output voltage and determine if the output voltage is within a predetermined operational voltage range of the image forming apparatus by comparing the output voltage with the predetermined operational voltage range of the image forming apparatus.

Referring to FIG. 2, the AC power input unit 210 receives an AC voltage, a magnitude and direction of which periodically vary according time, from an external power supply source. For example, since South Korea uses an AC voltage of 220 V at 60 Hz as a standard voltage, the AC voltage input to the SMPS from the external power supply source may be an AC voltage of 220 V at 60 Hz.

The filter unit 220 can remove electrical noise. The filter unit 220 can remove electrical noise input from the AC power input unit 110, or minimize and/or prevent electrical noise generated in the SMPS 200 from exiting. The filter unit 220 may include an inductor called a common-mode choke, and a capacitor that is an X-capacitor or a Y-capacitor. For example, the filter unit 120 may be an electromagnetic interference (EMI) filter. The filter unit 120 filters noise, such as EMI generated due to an AC voltage. The EMI refers to a phenomenon where an electromagnetic wave generated from an electronic product affects the operation of the electronic product or other devices.

The rectifying circuit unit 230 rectifies an AC voltage. For example, the rectifying circuit unit 230 may be a bridge diode rectifying circuit, in other words, a bridge rectifier. The bridge diode rectifying circuit may be an arrangement of four diodes in a bridge circuit configuration. The feature of the bridge diode rectifying circuit is that the polarity of the output is the same regardless of the polarity at the input.

The smoothing circuit unit 240 smoothes rectified power. That is, an AC voltage is rectified by the rectifying circuit unit 230 into a pulsating voltage, not a DC voltage. The smoothing circuit unit 240 reduces a ripple of the pulsating voltage. The smoothing circuit unit 240 may include a capacitor and a resistor. The capacitor can reduce the ripple of rectified power, and the resistor discharges electric charges accumulated in the capacitor in order to minimize and/or prevent product liability (PL). The smoothing circuit unit 240 may include only a capacitor without a resistor. A magnitude of a DC voltage output from the smoothing circuit unit 240 varies according to an AC voltage input from the outside. If an AC voltage input from the outside is 110 V, a DC voltage of about 155 V is output, and if an AC voltage input from the outside is 220 V, a DC voltage of about 310 V is output. A DC voltage output from the smoothing circuit unit 240 is input to the transforming unit 250 and the overvoltage detecting unit 280.

The transforming unit 250 may include at least one transformer. A primary coil and a secondary coil of the transformer may have a predetermined turns ratio therebetween, and the transforming unit 250 may increase or decrease power input to the transformer through the smoothing circuit unit 240 to a predetermined DC voltage according to the turns ratio. For example, the image forming apparatus uses a DC voltage of 3.3 V, 5 V, 12 V, or 24 V. Since a voltage input to the primary coil of the transformer through the smoothing circuit unit 240 is a DC voltage of about 155 V or 310 V, the transforming unit 250 may decrease power to a voltage appropriate for the image forming apparatus by adjusting the turns ratio.

In order to transfer energy from the primary coil to the secondary coil of the transformer, a current may be varied. Since a DC voltage passing through the smoothing circuit unit 240 can be input to the primary coil of the transformer included in the SMPS 200, as described above, a device may be used to cause variations in a current. Current variations may be performed by the switching unit 260. For example, the switching unit 260 may generate square wave power by being turned on or off in order to cause variations in a DC voltage input to the primary coil of the transformer.

The switching unit 260 includes the main switch 262 and the switching control unit 264 to control the main switch 262. The main switch 262 is repeatedly turned on or off at a predetermined frequency of tens of KHz. When the main switch 262 is turned on, energy is accumulated on a primary side of the transformer, and when the main switch 262 is turned off, the energy accumulated on the primary side is transferred to a secondary side. As a period of time for which the main switch 262 is turned on increases, energy is accumulated and transferred to the secondary side. The switching control unit 264 controls a period of time for which the main switch 262 is turned on or off. The switching control unit 264 may be a pulse-width modulation (PWM) integrated circuit (IC).

Referring to FIG. 2A, the switching control unit 264 monitors an output voltage by using a photocoupler 272 and compares the output voltage with a voltage appropriate for an electronic product. When the output voltage is higher than the voltage appropriate for the electronic product, an on-time is reduced, when the output voltage is equal to the voltage appropriate for the electronic product, the on-time is maintained, and when the output voltage is lower than the appropriate voltage, the on-time is increased to maintain the output voltage.

Referring to FIGS. 2 and 2A, the output unit 270, which is a circuit connected to the secondary coil of the transformer, outputs a complete DC voltage by removing a ripple of a voltage transformed by the transformer. The output unit 270 may include a rectifying circuit. An output voltage passing through the output unit 270 may be a DC voltage of 3.3 V, 5 V, 12 V, or 24 V, and may be a voltage appropriate for an electronic product.

The overvoltage detecting unit 280 detects a DC voltage output from the smoothing circuit unit 240, and determines whether the detected DC voltage is an overvoltage by comparing the detected DC voltage with a reference voltage. For example, a maximum allowance of a rated voltage of the SMPS 200 may be set as the reference voltage, and whether a DC voltage output from the smoothing circuit unit 240 is an overvoltage may be determined by determining whether the DC voltage is higher than the reference voltage.

The reference voltage may be set variously. For example, if the SMPS 200 uses an AC voltage of 110 V as a rated voltage, a DC voltage passing through the smoothing circuit unit 240 may be a 155 V. If an error of 15% is allowed, the DC voltage passing through the smoothing circuit unit 240 may be determined to be a rated voltage when the DC voltage ranges from about 132 V to 178 V. However, when the DC voltage passing through the smoothing circuit unit 240 exceeds 178 V, which is a maximum allowance of the rated voltage, the DC voltage may be determined to be an overvoltage. As such, whether a DC voltage is an overvoltage may be determined by using a maximum allowance of a rated voltage of the SMPS 200 as the reference voltage. Alternatively, if an AC voltage of 220 V is applied to the SMPS 200 that uses an AC voltage of 110 V as a rated voltage, a DC voltage passing through the smoothing circuit unit 240 may be 310 V. In this case, if an error of 15% is allowed, the DC voltage passing through the smoothing circuit unit 240 may range from about 264 V to 357 V. Accordingly, when the DC voltage passing through smoothing circuit unit 240 is equal to or higher than 264 V, it may be determined that an overvoltage of 220 V is applied to the SMPS 200. If both voltages of 110 V and 220 V are used as supply power as in South Korea, whether an overvoltage of 220 V is applied to the SMPS 200 may be determined in the same manner. That is, whether a DC voltage is an overvoltage may be determined by using a minimum allowance of 220 V as a reference voltage.

If it is determined that a DC voltage output from the smoothing circuit unit 240 is an overvoltage, the overvoltage detecting unit 280 outputs a signal indicating that an overvoltage is applied to the switching control unit 264.

Figure 3:
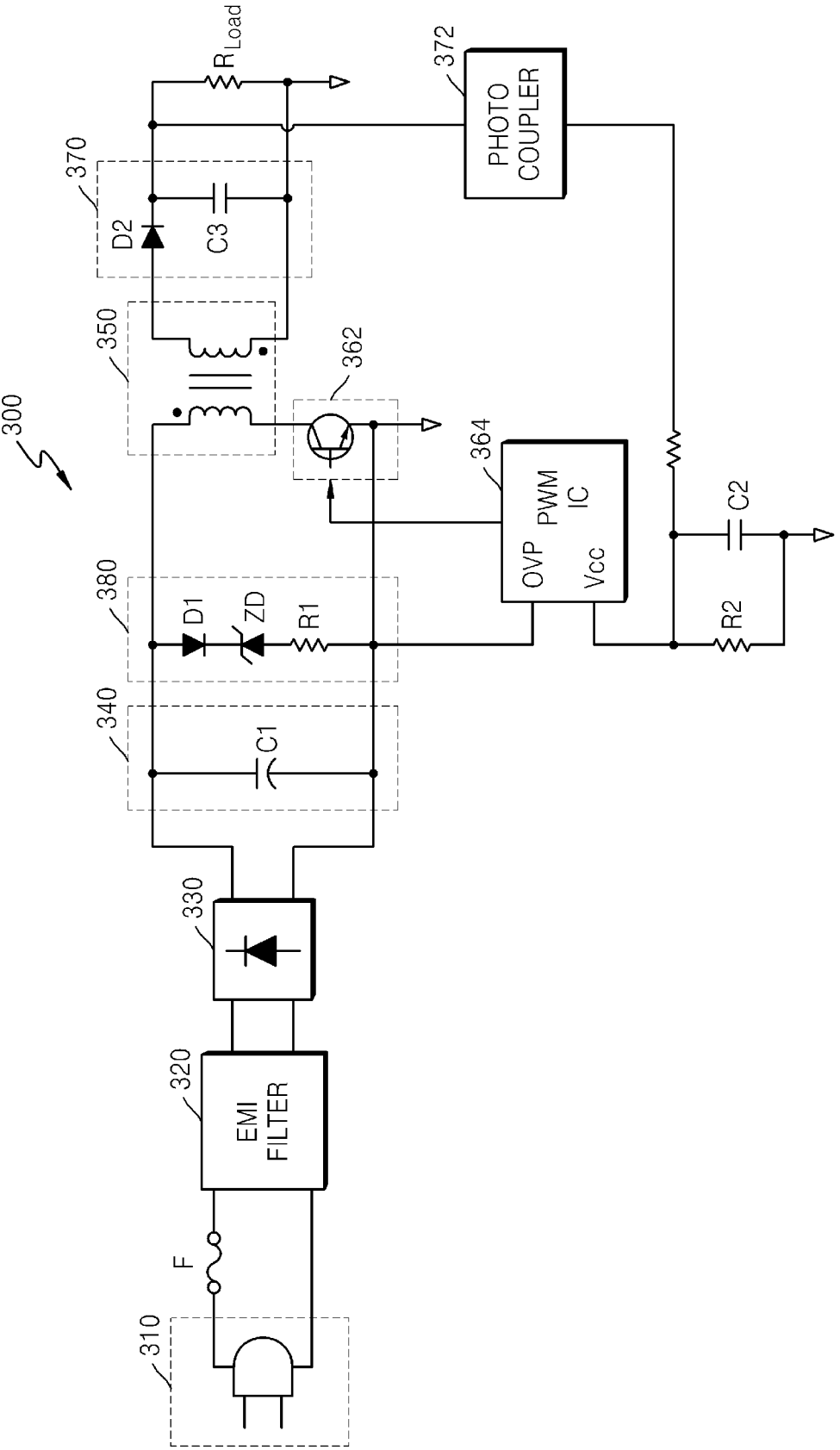
FIG. 3 is a circuit diagram illustrating an SMPS for an image forming apparatus having an overvoltage cutoff function, according to an embodiment of the present general inventive concept.
Figure 5:
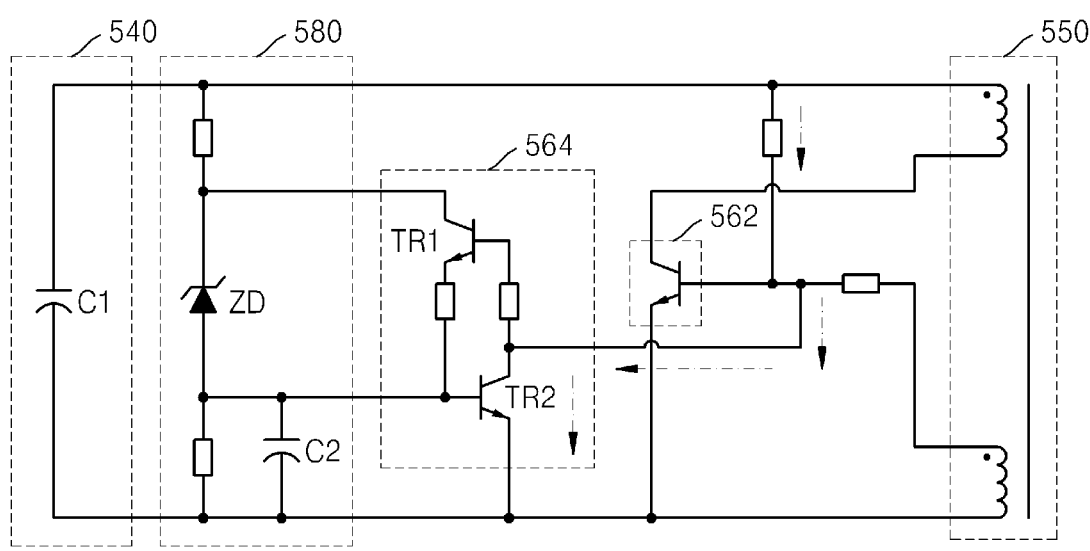
FIG. 5 is a circuit diagram illustrating an SMPS for an image forming apparatus having an overvoltage cutoff function, according to another embodiment of the present general inventive concept.

In a normal operation mode in which a rated voltage is applied to the SMPS 200, the switching control unit 264 switches the main switch 262 by controlling an operation of the main switch 262, and in an abnormal operation mode in which an overvoltage is applied to the SMPS 200, the switching control unit 264 prevents energy from being transferred from the primary coil to the secondary coil of the transformer by stopping a switching operation of the main switch 262. The switching control unit 264 may be a PWM IC or a switching control circuit. FIG. 3 shows the former case and FIG. 5 shows the latter case.

FIG. 3 is a circuit diagram illustrating an SMPS 300 for an image forming apparatus, according to an embodiment of the present general inventive concept. Referring to FIG. 3, the SMPS 300 includes an AC power input unit 310, a filter unit 320, a rectifying circuit unit 330, a smoothing circuit unit 340, a transforming unit 350, a main switch 362, a switching control unit 364, an output unit 370, and an overvoltage detecting unit 380. The description of the SMPS 200 made with reference to FIG. 2 may apply to the SMPS 300 of FIG. 3. As shown in FIG. 3, the switching control unit 364 may be a PWM IC. It would be understood by one of ordinary skill in the art that the SMPS 300 may further include elements other than the elements shown in FIG. 3.

An AC voltage is applied to the AC power input unit 310 from an external power supply source, and is output to the filter unit 320. A fuse F may be disposed between the AC power input unit 310 and the filter unit 320. The filter unit 320 may be an EMI filter, as illustrated in FIG. 3. An AC voltage from which noise is removed by the filter unit 320 is input to the rectifying circuit unit 330 and is rectified. The rectified power is changed to a DC voltage with a reduced ripple by passing through the smoothing circuit unit 340 including a capacitor C1. The transforming unit 350 may be a transformer including a primary coil and a secondary coil which are isolated from each other, as illustrated in FIG. 3. The DC voltage passing through the smoothing circuit unit 340 is input to the primary coil of the transformer, and variations occur in the DC voltage input to the primary coil due to a switching operation of the main switch 362. The main switch 362 may be a transistor, as illustrated in FIG. 3, but the present embodiment is not limited thereto and may be any of various switching devices, such as a metal-oxide semiconductor field-effect transistor (MOSFET). Energy is accumulated and transferred by the transformer according to the switching operation of the main switch 362. A voltage transformed by the transformer is transferred to the secondary coil, and a more stable DC voltage can be output with a diode D2 and a capacitor C3 of a circuit included in the output unit 370. The output unit 370 may include a half-wave rectifying circuit as shown in FIG. 3, but the present embodiment is not limited thereto and the output unit 370 may include any of various rectifying circuits, such as a full-wave rectifying circuit.

The switching operation of the main switch 362 may be adjusted by a switching control signal output from the switching control unit 364, and the switching control unit 364 may be the PWM IC, as illustrated in FIG. 3. Power to drive the switching control unit 364 may be supplied by feeding back a voltage output from the output unit 370. In this case, the output unit 370 and the switching control unit 364 may be connected to each other through a photocoupler 372. Similar to FIG. 2A, the photocoupler 372 in FIG. 3 may include a light-emitting diode and a phototransistor. The light-emitting diode acts as an emitter, and the phototransistor acts as a receiver of the photocoupler 372. The light-emitting diode may be disposed close to an output of the output unit 370 to receive the output voltage of the output unit 370 and emit light according to the output voltage, and the phototransistor may be disposed close to the switching control unit 364 to receive light emitted by the light-emitting diode and convert the light into electrical energy. When the phototransistor receives light and allows the light to pass therethrough, power is supplied to a power input terminal of the switching control unit 364 through a circuit including a resistor R2 and a capacitor C2.

The switching control unit 364 may include an overvoltage protection (OVP) pin in order to protect the circuit. A signal indicating that the overvoltage detecting unit 380 determines that an abnormal voltage or an overvoltage is applied can be input to the OVP pin. A protection circuit connected to the OVP pin may be disposed in the switching control unit 364. For example, when a signal indicating that an overvoltage is applied is input to the OVP pin, the protection circuit may cut off a switching control signal output from the switching control unit 364 to the main switch 362.

The overvoltage detecting unit 380 may be configured such that a diode D1, a Zener diode ZD, and a resistor R1 are connected in series as illustrated in FIG. 3. The overvoltage detecting unit 380 may include a power detecting unit to detect power input to the primary coil of the transformer and an overvoltage determining unit to determine whether the detected power is an overvoltage by comparing the detected power with a reference voltage. In FIG. 3, the diode D1 connected to the smoothing circuit unit 340 may be the power detecting unit, and the Zener diode ZD and the resistor R1 connected to the Zener diode ZD may be the overvoltage determining unit. Power output from the smoothing circuit unit 340 can be transferred through the diode D1 to the Zener diode ZD that is reversely connected to the diode D1. The Zener diode ZD may have a preset breakdown voltage (in other words, a Zener voltage). In this case, the preset breakdown voltage may become a reference voltage to determine the existence of an overvoltage. When a voltage higher than the preset breakdown voltage of the Zener diode ZD reversely connected to the diode D1 is input to the Zener diode ZD, the voltage passes through the Zener diode ZD, and when a voltage lower than the breakdown voltage is input to the Zener diode ZD, the voltage does not pass through the Zener diode ZD. If a reference voltage to determine the existence of an overvoltage is the breakdown voltage of the Zener diode ZD, it may be determined whether a DC voltage output from the smoothing circuit unit 340 is an overvoltage by determining whether the DC voltage passes through the Zener diode ZD. When a DC voltage output from the smoothing circuit unit 340 is an overvoltage, the DC voltage passes through the Zener diode ZD, a signal is transmitted to the OVP pin of the switching control unit 364 through the resistor R1, and the switching control unit 364 cuts off a switching control signal output from the switching control unit 364 in order to stop a switching operation of the main switch 362. As a result, an output voltage is not generated in the output unit 370 connected to the secondary side of the transformer, thereby preventing an overvoltage from affecting a load terminal.

Figure 4:
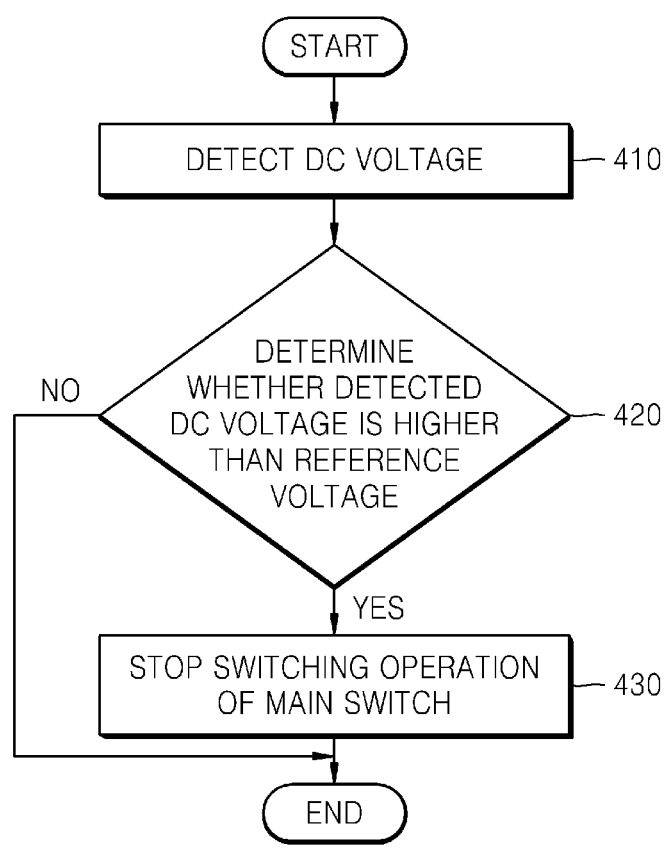
FIG. 4 is a flowchart illustrating a method of cutting off an overvoltage which is performed by the SMPS of FIG. 2, according to an embodiment of the present general inventive concept.

FIG. 4 is a flowchart illustrating a method of cutting off an overvoltage performed by the SMPS 200 of FIG. 2, according to an embodiment of the present general inventive concept.

Referring to FIG. 4, in operation 410, the overvoltage detecting unit 280 detects a DC voltage output through the rectifying circuit unit 230 and the smoothing circuit unit 240. The DC voltage is the same as a DC voltage input to the primary coil of the transformer of the transforming unit 250.

In operation 420, the overvoltage detecting unit 280 determines whether the detected DC voltage is an overvoltage by comparing the detected DC voltage with a reference voltage. When the detected DC voltage is lower than the reference voltage, the SMPS 200 normally operates. When the detected DC voltage is higher than the reference voltage, an overvoltage has been applied, and the method proceeds to operation 430.

In operation 430, when a signal indicating that an overvoltage is applied is input from the overvoltage detecting unit 280, the switching control unit 264 stops a switching operation of the main switch 262. Accordingly, an output voltage is not generated in the output unit 270 connected to the secondary side of the transformer.

FIG. 5 is a circuit diagram illustrating an SMPS for an image forming apparatus having an overvoltage cutoff function, according to another embodiment of the present general inventive concept. Unlike FIG. 3 in which the switching control unit 264 is a PWM IC, in FIG. 5, the switching control unit 264 is a switching control circuit 564. Other elements of the SMPS are the same as illustrated in FIG. 3 and thus are not illustrated in FIG. 5, and a structure between the smoothing circuit unit 540 and a transforming unit 550 is illustrated in FIG. 5.

Referring to FIG. 5, a main switch 562 connected to a primary coil of the transforming unit 550 may be a transistor, as illustrated in FIG. 5. A base terminal of the transistor of the main switch 562 and a collector terminal of a transistor TR2 in the switching control circuit 564 are connected to each other, and a base terminal of the transistor TR2 in the switching control circuit 564 is connected to one terminal of a Zener diode ZD in an overvoltage detecting unit 580.

A DC voltage output from the smoothing circuit unit 540 including a capacitor C1 is input to the overvoltage detecting unit 580. When a DC voltage higher than a breakdown voltage of the Zener diode ZD that uses the breakdown voltage as a reference voltage to determine if the existence of an overvoltage is input, the DC voltage passes through the Zener diode ZD. A signal indicating that an overvoltage is applied is transmitted to the base terminal of the transistor TR2 in the switching control circuit 564, and the DC voltage passes through the transistor TR2. Accordingly, since a voltage applied to the base terminal of the main switch 562 is grounded by the transistor TR2, the main switch 562 no longer performs a switching operation. Accordingly, energy may not be transferred from the primary coil to a secondary side of the transforming unit 550 and an output voltage is not generated on the secondary side, thereby preventing an overvoltage from affecting a load terminal.

Figure 6:
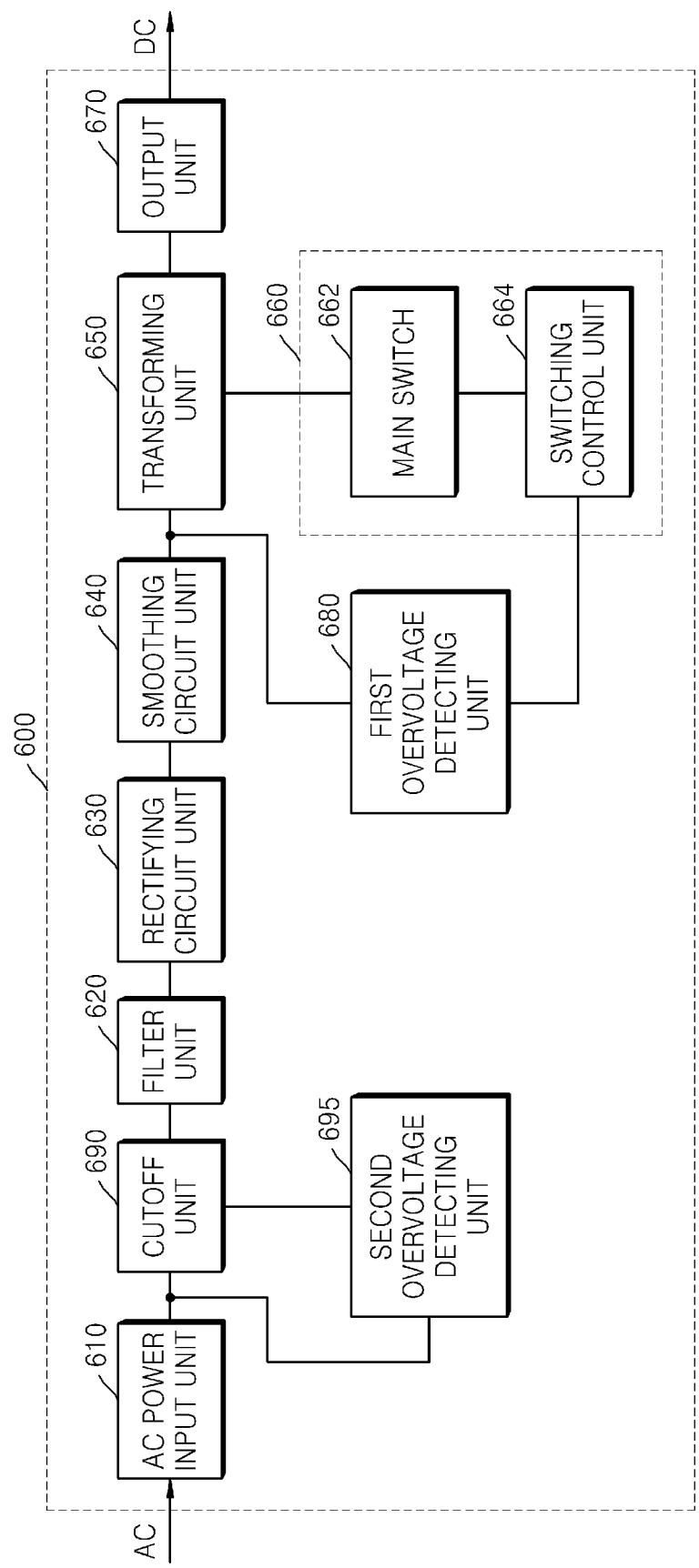
FIG. 6 is a block diagram illustrating an SMPS for an image forming apparatus having an overvoltage cutoff function, according to another embodiment of the present general inventive concept.

FIG. 6 is a block diagram illustrating an SMPS 600 for an image forming apparatus having an overvoltage cutoff function, according to another embodiment of the present general inventive concept. Referring to FIG. 6, the SMPS 600 includes an AC power input unit 610, a filter unit 620, a rectifying circuit unit 630, a smoothing circuit unit 640, a transforming unit 650, a switching unit 660, an output unit 670, a first overvoltage detecting unit 680, a cutoff unit 690, and a second overvoltage detecting unit 695. The switching unit 660 includes a main switch 262 and a switching control unit 264. The SMPS 600 of FIG. 6 further includes the cutoff unit 690 and the second overvoltage detecting unit 695, compared to the SMPS 200 of FIG. 2. Since the term 'first' in the first overvoltage detecting unit 680 of FIG. 6 is used to distinguish the first overvoltage detecting unit 680 from the second overvoltage detecting unit 695, the first overvoltage detecting unit 680 is the same as the overvoltage detecting unit 280 of FIG. 2. A detailed explanation of the same elements in FIG. 6 as those in FIG. 2 is not provided.

Referring to FIG. 6, the cutoff unit 690 is disposed between the AC power input unit 610 and the filter unit 620. The second overvoltage detecting unit 695 detects an AC voltage output from the AC power input unit 610, and determines whether the detected AC voltage is an overvoltage by comparing the detected AC voltage with a reference voltage. The second overvoltage detecting unit 695 outputs a result of the determination to the cutoff unit 690. When a signal indicating that an overvoltage is applied is input from the second overvoltage detecting unit 695 to the cutoff unit 690, the cutoff unit 690 cuts off an AC voltage output from the AC power input unit 610 to the filter unit 620. As a result, when an AC voltage, which is an overvoltage, is applied to the SMPS 600, the AC voltage is cut off by the cutoff unit 690, thereby preventing damage to the circuits in the SMPS 600 and the image forming apparatus.

Figure 7:
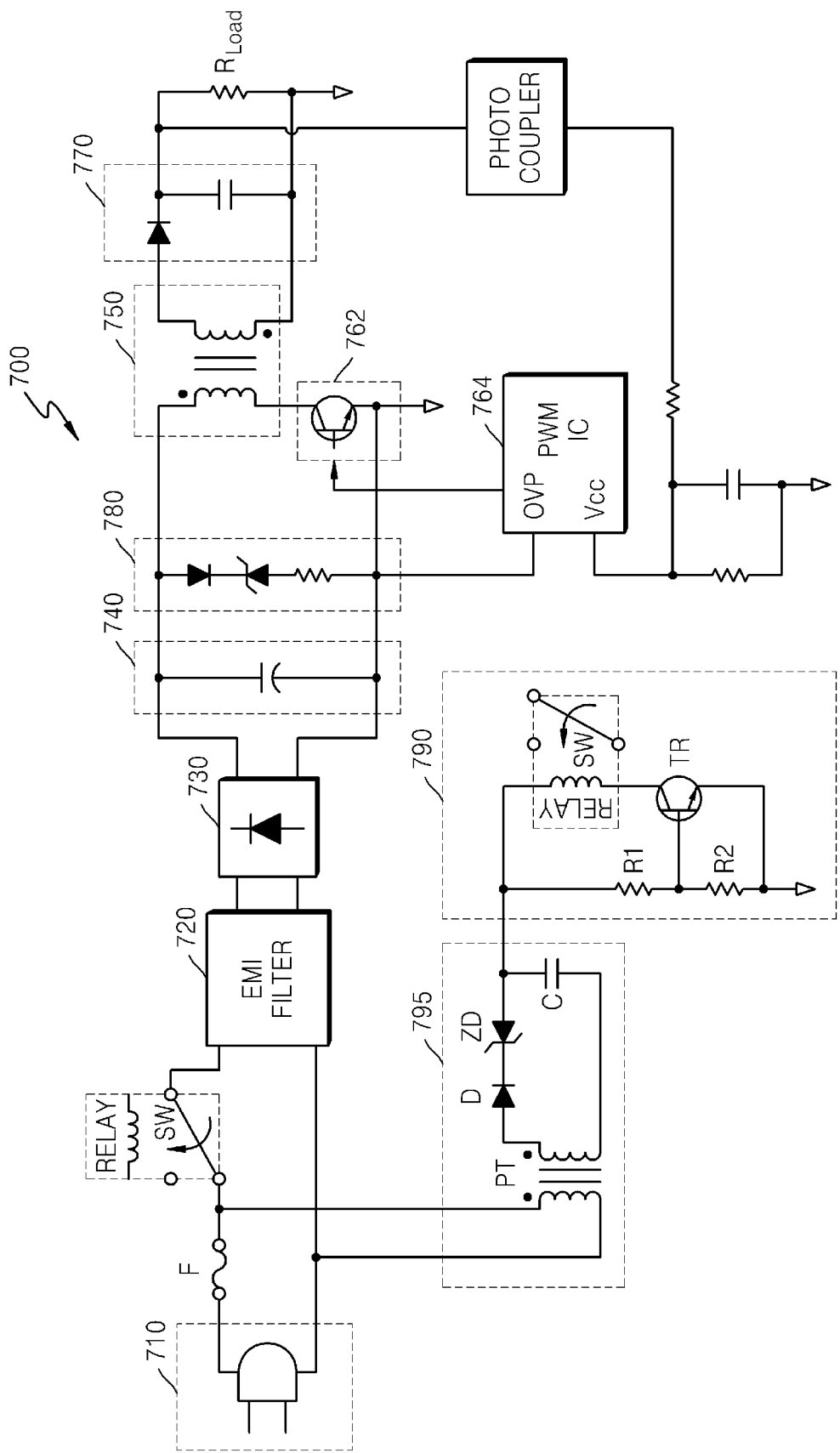
FIG. 7 is a circuit diagram illustrating an SMPS for an image forming apparatus having an overvoltage cutoff function, according to another embodiment of the present general inventive concept.

FIG. 7 is a circuit diagram illustrating an SMPS 700 for an image forming apparatus having an overvoltage cutoff function, according to another embodiment of the present general inventive concept. Referring to FIG. 7, the SMPS 700 includes an AC power input unit 710, a filter unit 720, a rectifying circuit unit 730, a smoothing circuit unit 740, a transforming unit 750, a main switch 762, a switching control unit 764, an output unit 770, a first overvoltage detecting unit 780, a cutoff unit 790, and a second overvoltage detecting unit 795. It would be understood by one of ordinary skill in the art that the SMPS 700 may further include elements other than the elements shown in FIG. 7.

The SMPS 700 of FIG. 7 further includes some elements, compared to the SMPS 300 of FIG. 3, and the description of the SMPS 300 made with reference to FIG. 3 may apply to the SMPS 700 of FIG. 7. The newly added elements in FIG. 7 will now be explained. Referring to FIG. 7, the SMPS 700 is configured such that the cutoff unit 790 and the second overvoltage detecting unit 795 are disposed between the AC power input unit 710 and the filter unit 720.

An AC voltage output from the AC power input unit 710 is input to the second overvoltage detecting unit 795 that is connected in parallel to the filter unit 710. The second overvoltage detecting unit 795 may include a second power detecting unit and a second overvoltage determining unit according to a detailed function. The second power detecting unit of the second overvoltage detecting unit 795 decreases an AC voltage output from the AC power input unit 710 according to a transformation ratio of a potential transformer (PT) to a predetermined level and rectifies the decreased AC voltage by passing the decreased AC voltage through a diode D. The second overvoltage determining unit includes a Zener diode ZD reversely connected to the diode D. A breakdown voltage of the Zener diode ZD may be a reference voltage to determine the existence of an overvoltage. When the rectified power input to the Zener diode ZD is higher than the breakdown voltage, the rectified power passes through the Zener diode ZD and a signal indicating that an overvoltage is applied is input to the cutoff unit 790. In this case, the signal indicating that an overvoltage is applied includes a value obtained by subtracting the preset breakdown voltage of the Zener diode ZD from the rectified power.

For example, if the transformation ratio of the PT is 10:1, an AC voltage output from the AC power input unit 710 is decreased to 1/10 by passing through the PT. As a result, when an AC voltage is 110 V, power rectified by the diode D is changed to a DC voltage of about 15.5 V (if an error of about 15% is allowed and the DC voltage ranges from 1.2 V to 17.8 V), and when an AC voltage is 220 V, power rectified by the diode D is changed to a DC voltage of about 31 V (if an error of about 15% is allowed and the DC voltage ranges from 26.3 V to 35.7 V). In this case, a reference voltage to determine the existence of an overvoltage may be set variously. If the SMPS 700 has a rated voltage of 110 V, when power rectified by the diode D exceeds 17.8 V, since the power exceeds a maximum allowance of the rated voltage and it may be determined that an overvoltage is applied, a reference voltage may become 17.8 V. Alternatively, whether an AC voltage of 220 V is applied to the SMPS 700 that uses 110 V as a rated voltage may be determined. That is, when power rectified by the diode D exceeds 26.3 V, the rectified power exceeds a minimum value of 220 V and it may be determined that an overvoltage of 220 V is applied to the SMPS 700, a reference voltage may become 26.3 V.

The cutoff unit 790 may be configured such that a base terminal of a transistor TR is connected between a resistor R1 and a resistor R2, a collector terminal of the transistor TR is connected to one side of a relay RELAY, and an emitter terminal of the transistor TR is grounded. A switch SW of the relay RELAY is disposed between the AC power input unit 710 and the filter unit 720 and performs a switching operation according to the state of an electromagnet in the relay RELAY. Unlike in FIG. 7, the relay RELAY may be a photo triac including a light-emitting diode and a triac, or a photocoupler including a light-emitting diode and a phototransistor. The cutoff unit 790 operates according to a signal output from the second overvoltage detecting unit 795. When power rectified by the diode D passes through the Zener diode ZD reversely connected to the diode D of the second overvoltage detecting unit 795, a signal indicating that an overvoltage is applied is input to the cutoff unit 790, and thus, the transistor TR and the relay RELAY operate. When the relay RELAY is turned on, the electromagnet attracts the switch SW, one side of the switch SW connected to the AC power input unit 710 is separated from the AC power input unit 710, and an AC voltage output from the AC power input unit 710 to the filter unit 720 is cut off. On the contrary, when power rectified by the diode D does not pass through the Zener diode ZD reversely connected to the diode D of the second overvoltage detecting unit 795, there is no signal output to the cutoff unit 790, the transistor TR and the relay RELAY do not operate, the switch SW connects the AC power input unit 710 and the filter unit 720, and an AC voltage is input to the filter unit 720.

FIG. 8 is a flowchart illustrating a method of cutting off an overvoltage performed by the SMPS 600 of FIG. 6, according to another embodiment of the present general inventive concept.

In operation 810, the second overvoltage detecting unit 695 detects an AC voltage output from the AC power input unit 610. The AC voltage is the same as an AC voltage passing through the cutoff unit 690 and input to the filter unit 620.

In operation 820, the second overvoltage detecting unit 695 determines whether the detected AC voltage is an overvoltage by comparing the detected AC voltage with a second reference voltage. In this case, the second overvoltage detecting unit 695 decreases the detected AC voltage to a predetermined level by using the PT, rectifies the decreased AC voltage, and transforms the rectified AC voltage into a DC voltage. When it is determined in operation 820 that the rectified power is lower than the second reference voltage, an AC voltage output from the AC power input unit 610 is not cut off by the cutoff unit 690 and is input to the filter unit 620, and passes through the rectifying circuit unit 630 and the smoothing circuit unit 640, and the method proceeds to operation 840. When it is determined in operation 820 that the rectified power is higher than the second reference voltage, it is determined that an overvoltage is applied and the method proceeds to operation 830.

In operation 830, when a signal indicating that an overvoltage is applied is input from the second overvoltage detecting unit 695, the cutoff unit 690 cuts off an AC voltage output from the AC power input unit 610 to the filter unit 620.

In operation 840, the first overvoltage detecting unit 680 detects a DC voltage passing through the rectifying circuit unit 630 and the smoothing circuit unit 640 and output from the smoothing circuit unit 640. The DC voltage is the same as a DC voltage input to the primary coil of the transformer of the transforming unit 250.

In operation 850, the first overvoltage detecting unit 680 determines whether the detected DC voltage is an overvoltage by comparing the detected DC voltage with a first reference voltage. Since there may be a predetermined time delay for the cutoff unit 690 to cut off an AC voltage corresponding to an overvoltage, the AC voltage may become a DC voltage while passing through the rectifying circuit unit 630 and the smoothing circuit unit 640. Alternatively, the AC voltage may become an abnormal power while passing through the filter unit 620, the rectifying circuit unit 630, and the smoothing circuit unit 640. When it is determined in operation 850 that the DC voltage detected by the first overvoltage detecting unit 680 is lower than the first reference voltage, the SMPS 600 normally operates. Otherwise, when it is determined in operation 850 that the detected DC voltage is higher than the first reference voltage, an overvoltage has been applied, and the method proceeds to operation 860.

In operation 860, when a signal indicating that an overvoltage is applied is input from the first overvoltage detecting unit 680, the switching control unit 664 stops a switching operation of the main switch 662. Accordingly, an output voltage is not generated in the output unit 670 connected to the secondary side of the transformer.

In operations 810 through 860, whether an AC voltage applied to the SMPS 600 is an overvoltage is determined and the AC voltage is cut off when it is determined that the AC voltage is an overvoltage. Also, whether a DC voltage input to the primary coil of the transformer is an overvoltage is determined and a switching operation of the main switch 662 to adjust an output of the transformer is stopped when it is determined that the DC voltage is an overvoltage, thereby preventing an overvoltage from affecting a load terminal connected to the secondary side of the transformer.

When an AC voltage applied from the outside is an overvoltage higher than a rated voltage of an SMPS for an image forming apparatus, damage to circuits in the SMPS and the image forming apparatus may be prevented.

While the present invention has been particularly shown and described with reference to exemplary embodiments thereof using specific terms, the embodiments and terms have been used to explain the present general inventive concept and should not be construed as limiting the scope of the present general inventive concept defined by the claims. The exemplary embodiments should be considered in a descriptive sense only and not for purposes of limitation. Therefore, the scope of the present general inventive concept is defined not by the detailed description of the present general inventive concept but by the appended claims, and all differences within the scope will be construed as being included in the present general inventive concept.

What is claimed is:

1. A switching-mode power supply (SMPS) for an image forming apparatus, the SMPS comprising:
 a rectifying circuit unit to rectify an alternating-current (AC) voltage input from an external power supply source into a direct-current (DC) voltage;
 a transformer to transform the rectified DC voltage input to a primary coil and to output the transformed DC voltage to a secondary coil;
 a main switch that is connected to the primary coil to switch an output of the transformer;
 a first overvoltage detecting unit to determine whether the rectified DC voltage is an overvoltage by comparing the rectified DC voltage with a first reference voltage;
 a switching control unit to control a switching operation of the main switch based on a result of the determination;
 a second overvoltage detecting unit to transform the input AC voltage and to determine whether the transformed AC voltage is an overvoltage by comparing the transformed AC voltage with a second reference voltage; and
 a cutoff unit to cut off the input AC voltage input to the rectifying circuit unit based on a result of the determination of the second overvoltage detecting unit.

2. The SMSP device of claim 1, wherein the second overvoltage detecting unit comprises:
 a potential transformer to transform the input AC voltage according to a predetermined turns ratio;
 a rectifier to rectify the transformed AC voltage into a DC voltage; and
 a second overvoltage determining unit to determine whether the DC voltage rectified by the rectifier is an overvoltage by comparing the rectified DC voltage with the second reference voltage.

3. The SMPS of claim 2, wherein the second overvoltage determining unit determines whether the rectified DC voltage is an overvoltage by using a Zener diode that has the second reference voltage as a breakdown voltage.

4. The SMPS of claim 1, wherein the cutoff unit cuts off the input AC voltage input to the rectifying circuit unit by using any one of a relay, a photo triac, and a photocoupler.

5. A method of cutting off an overvoltage performed by a switching-mode power supply (SMPS) for an image forming apparatus, the method comprising:
 transforming an alternating-current (AC) voltage input from an external power supply source and determining whether the transformed AC voltage is an overvoltage by comparing the transformed AC voltage with a second reference voltage;
 cutting off the input AC voltage before the input AC voltage is rectified, based on a result of the determination;
 detecting a direct-current (DC) voltage obtained by rectifying the input AC voltage;
 determining whether the detected DC voltage is an overvoltage by comparing the detected DC voltage with a first reference voltage by using a Zener diode that has the first reference voltage as a breakdown voltage; and
 controlling a switching operation of a main switch that switches an output of a transformer for transforming the rectified DC voltage, based on a result of the determining whether the detected DC voltage is an overvoltage.

6. The method of claim 5, wherein the determining whether the transformed AC voltage is an overvoltage by comparing the transformed AC voltage with the second reference voltage comprises:
 transforming the input AC voltage according to a predetermined turns ratio by using a potential transformer;
 rectifying the transformed AC voltage into a DC voltage; and
 determining whether the rectified DC voltage is an overvoltage by comparing the rectified DC voltage with the second reference voltage.

7. An image forming apparatus comprising a switching-mode power supply (SMPS), wherein the SMPS comprises:
 a rectifying circuit unit to rectify an alternating-current (AC) voltage input from an external power supply source into a direct-current (DC) voltage;
 a transformer to transform the rectified DC voltage input to a primary coil and to output the transformed DC voltage to a secondary coil;
 a main switch that is connected to the primary coil to switch an output of the transformer;
 a first overvoltage detecting unit to determine whether the rectified DC voltage is an overvoltage by comparing the rectified DC voltage with a first reference voltage;
 a switching control unit to control a switching operation of the main switch based on a result of the determination;
 a second overvoltage detecting unit to transform the input AC voltage and determines whether the transformed AC voltage is an overvoltage by comparing the transformed AC voltage with a second reference voltage; and
 a cutoff unit to cut off the input AC voltage input to the rectifying circuit based on a result of the determination of the second overvoltage detecting unit.

8. A switching-mode power supply (SMPS) comprising:
 a rectifying unit to rectify a voltage input from a supply source;
 a first overvoltage detecting unit to detect the voltage rectified by the rectifying unit and to determine if the voltage is within a predetermined voltage range; and
 a switching control unit to stop a switching operation of a main switch that is connected to the switching control unit to prevent an output unit from outputting the voltage when the detected voltage is greater than the predetermined voltage range;
 a second overvoltage detecting unit to detect the voltage input from the supply source and to determine if the voltage is greater than the predetermined voltage range; and
 a cutoff unit to prevent the voltage input from the supply source from entering a filter unit when the voltage is greater than the predetermined voltage range.

9. The switching-mode power supply of claim 8, wherein the second overvoltage detecting unit comprises:
 a Zener diode to allow the second overvoltage detecting unit to determine if the voltage input from the supply source is greater than the predetermined voltage range.

* * * * *

UNITED STATES PATENT AND TRADEMARK OFFICE
CERTIFICATE OF CORRECTION

Page 1 of 1

PATENT NO. : 9,048,737 B2
APPLICATION NO. : 13/617980
DATED : June 2, 2015
INVENTOR(S) : An-sik Jeong et al.

It is certified that error appears in the above-identified patent and that said Letters Patent is hereby corrected as shown below:

In the claims

Claim 2, Column 15, Line 26

Delete "SMSP" and insert --SMPS--, therefor.

Signed and Sealed this
Twenty-seventh Day of October, 2015

Michelle K. Lee
*Director of the United States Patent and Trademark Office*